(12) United States Patent
Gilbert

(10) Patent No.: US 6,996,675 B2
(45) Date of Patent: Feb. 7, 2006

(54) RETRIEVAL OF ALL TAG ENTRIES OF CACHE LOCATIONS FOR MEMORY ADDRESS AND DETERMINING ECC BASED ON SAME

(75) Inventor: Bruce M. Gilbert, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 10/325,551

(22) Filed: Dec. 20, 2002

(65) Prior Publication Data

US 2004/0123035 A1    Jun. 24, 2004

(51) Int. Cl.
G06F 12/00    (2006.01)

(52) U.S. Cl. .................. 711/128; 711/144; 711/145; 714/6

(58) Field of Classification Search ............. 711/118, 711/129, 141, 128, 144, 145, 147, 119; 714/6
See application file for complete search history.

(56) References Cited

U.S. PATENT DOCUMENTS

| | | | |
|---|---|---|---|
| 5,509,119 A * | 4/1996 | La Fetra ................... 714/52 |
| 5,533,189 A * | 7/1996 | Cheong et al. ................ 714/6 |
| 6,564,306 B2 * | 5/2003 | Dugan et al. ............... 711/155 |
| 6,725,343 B2 * | 4/2004 | Barroso et al. ............. 711/145 |
| 6,772,383 B1 * | 8/2004 | Quach et al. ............... 714/746 |
| 2002/0124143 A1 * | 9/2002 | Barroso et al. ............. 711/145 |
| 2003/0093726 A1 * | 5/2003 | Tremblay et al. ............ 714/52 |
| 2003/0167437 A1 * | 9/2003 | DeSota et al. ............. 714/763 |
| 2004/0199851 A1 * | 10/2004 | Quach et al. ............... 714/758 |

* cited by examiner

*Primary Examiner*—Brian R. Peugh
(74) *Attorney, Agent, or Firm*—Abdy Raissinia (57) ABSTRACT

The retrieval of all tag entries of cache locations for a memory address is disclosed, as well as the determining of an error correcting code (ECC) for the tag entries based thereon. Tag entries of tag memory that correspond to possible cache locations within an n-way associative cache are retrieved for a memory address. An ECC for the tag entries, based on the entries, is determined, and is stored as part of the entries within the tag memory. The n-way associative cache may be a two-way associative cache, such that there are two tag entries corresponding to two possible cache locations within the cache for the memory address. The ECC for the two tag entries are thus based on the two tag entries.

19 Claims, 5 Drawing Sheets

RETRIEVAL OF ALL TAG ENTRIES OF CACHE LOCATIONS FOR MEMORY ADDRESS AND DETERMINING ECC BASED ON SAME

BACKGROUND OF THE INVENTION

1. Technical Field

This invention relates generally to tag entries that provide status information for locations within a cache for a memory address, and more particularly to the retrieval of such entries and determining an error-correcting code (ECC) for such entries.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems.

Each building block, or node, typically caches the distant shared, or remote, memory to improve memory access performance. At least because more than one node may cache the same remote memory at the same time, information regarding the caching of the remote memory is stored at each node. The information regarding the cache is known as a tag, and all the tags are stored in what is known as tag memory. There is a tag entry within the tag memory for each cache location within the cache. The tag entry may indicate, for instance, what memory location is being cached at its corresponding cache location, what other nodes are caching the memory location in their caches, and the status of the cache location.

Furthermore, the data in a cache is normally managed in fixed sized blocks, typically between 32 and 128 bytes long. With 32-byte blocks, the low five bits of the address ($2^5=32$) determine which byte within a block is desired. The remaining bits of an address are called the block address. The block address is further split into an index portion and a tag portion. The index portion, which is typically the low-order portion of the block address, determines where the block can be held in the cache The tag portion, typically the high order portion of the block address, is used to identify which block actually is stored at a given cache location. The number of bits used as the tag determines how many different memory addresses can be cached in the same location in the cache.

As a simple example, for a four-bit memory address having the three trailing bits 111, the leading bit can be either 0 or 1. If the tag is only this first leading bit, this means that for the cache location corresponding to the bits 111, either the memory address 0111 or the memory address 1111 can be stored. To ensure that using a cache improves performance, the process of determining whether the cache holds the data for the desired memory address should be performed quickly.

For performance reasons, tag memory is usually fast. This is so that memory accesses throughout the system are not unduly slowed. However, such fast memory is expensive, so it is desirably conserved as much as possible. Furthermore, activity on the tag memory bus is desirably lessened as much as possible, to also ensure optimal system performance. For these and other reasons, therefore, there is a need for the present invention.

SUMMARY OF THE INVENTION

The invention relates to the retrieval of all tag entries of cache locations for a memory address, and to determining an error correcting code (ECC) for the tag entries based thereon. In a method of the invention, tag entries of tag memory that correspond to possible cache locations within an n-way associative cache are retrieved for a memory address. An ECC for the tag entries, based on the entries, is determined, and is stored as part of the entries within the tag memory.

A system of the invention includes a plurality of processors, an n-way associative cache for remote memory to the plurality of processors, a tag memory, and at least one memory controller. The tag memory stores tag entries corresponding to possible cache locations within the n-way associative cache for a number of memory addresses of the remote memory. The tag entries for the memory addresses have an ECC based on the tag entries. The memory controller manages transactions relative to the n-way cache. For all tag entries for a given memory address, one of the memory controllers retrieves all the tag entries prior to determining whether any of the possible cache locations to which the tag entries correspond currently caches the given memory address.

A controller for a node of a system of the invention includes an n-way associative cache and a tag memory. The cache is for remote memory that is remote relative to the node. The tag memory stores tag entries corresponding to possible cache locations within the cache for memory addresses of the remote memory. The tag entries for the memory addresses having an error-correcting code (ECC) based on the tag entries. The controller retrieves, at the same time, all tag entries for a given memory address prior to determining whether any of the possible cache locations to which the tag entries correspond currently caches the address.

Other features, aspects, embodiments and advantages of the invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DESCRIPTION OF THE PREFERRED EMBODIMENT

Overview

Figure 1:
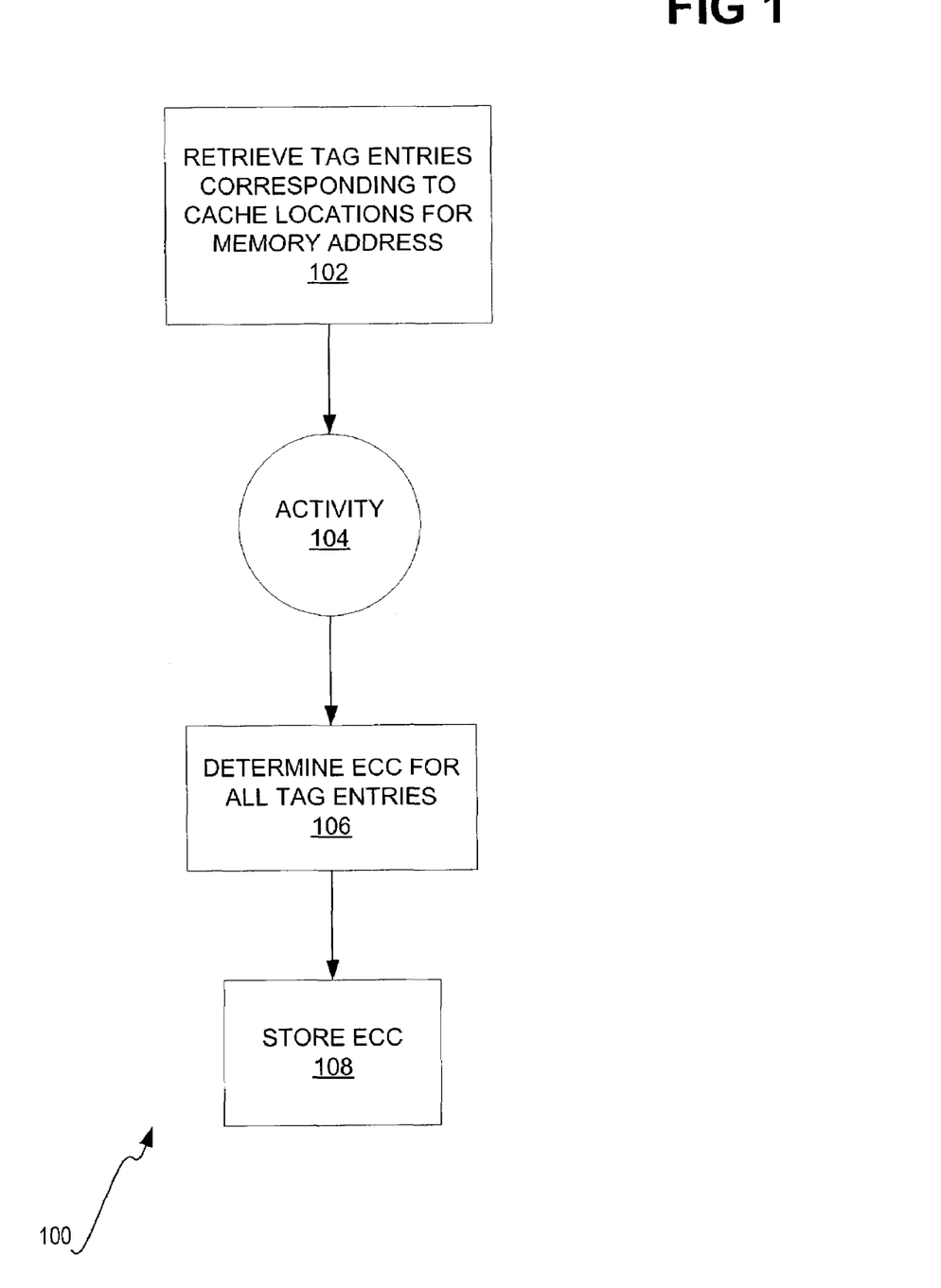
FIG. 1 is a flowchart of a method according to a preferred embodiment of the invention, and is suggested for printing on the first page of the patent.

FIG. 1 shows a method 100 according to a preferred embodiment of the invention. The method 100 can be implemented as an article of manufacture having a computer-readable medium and means in the medium for performing the functionality of the method 100. The medium may be a recordable data storage medium, a modulated carrier signal, or another type of medium. The method 100 preferably is operable within a multiple-processor system in which each node has local memory, and the local memory of other nodes is remote memory cached by a node in an n-way cache. An n-way associative cache means that there are n different locations within the cache to cache a given memory address of the remote memory. The method 100 is also preferably operable in conjunction with a tag memory of a given node of the system, where there are n tag entries corresponding to the n cache locations for each memory address of the remote memory.

The method 100 retrieves the n tag entries of the tag memory that correspond to the possible cache locations within the n-way associative cache for a given memory address (102). Preferably, the n tag entries are retrieved by the method 100 simultaneously—that is, at the same time—and as a group. Activity regarding one or more of the cache locations and/or one or more of the n tag entries then occurs (104), as is described in more detail in a later section of the detailed description. An error-correcting code (ECC) is determined for all the n tag entries, based on all the n tag entries (106). The ECC is finally stored as part of the n tag entries within the tag memory (108).

By reading all the n tag entries for a given memory address, the need to perform a read-modify-write operation in the future, when a single tag entry is modified, is avoided. That is, reading all tag entries for a given memory address at the same time, the new ECC can be determined and written without a further read when one of the tag entries is modified. Thus, should any of the tag entries need to be modified, because, for instance, the contents of one of the cache locations that is currently caching the memory address is modified, then no further tag bus activity is needed to determine the ECC. Since all the tag entries have already been read, all the information needed to determine the ECC is already available, and does not have to be further retrieved from the tag memory. Minimizing activity on the tag memory bus in this way thus ensures optimal performance. Further, by having a single ECC for all the n tag entries for a given address, tag memory is conserved as compared to having an ECC for each tag entry.

System, N-Way Associative Caches, and Tag Memories

Figure 2:
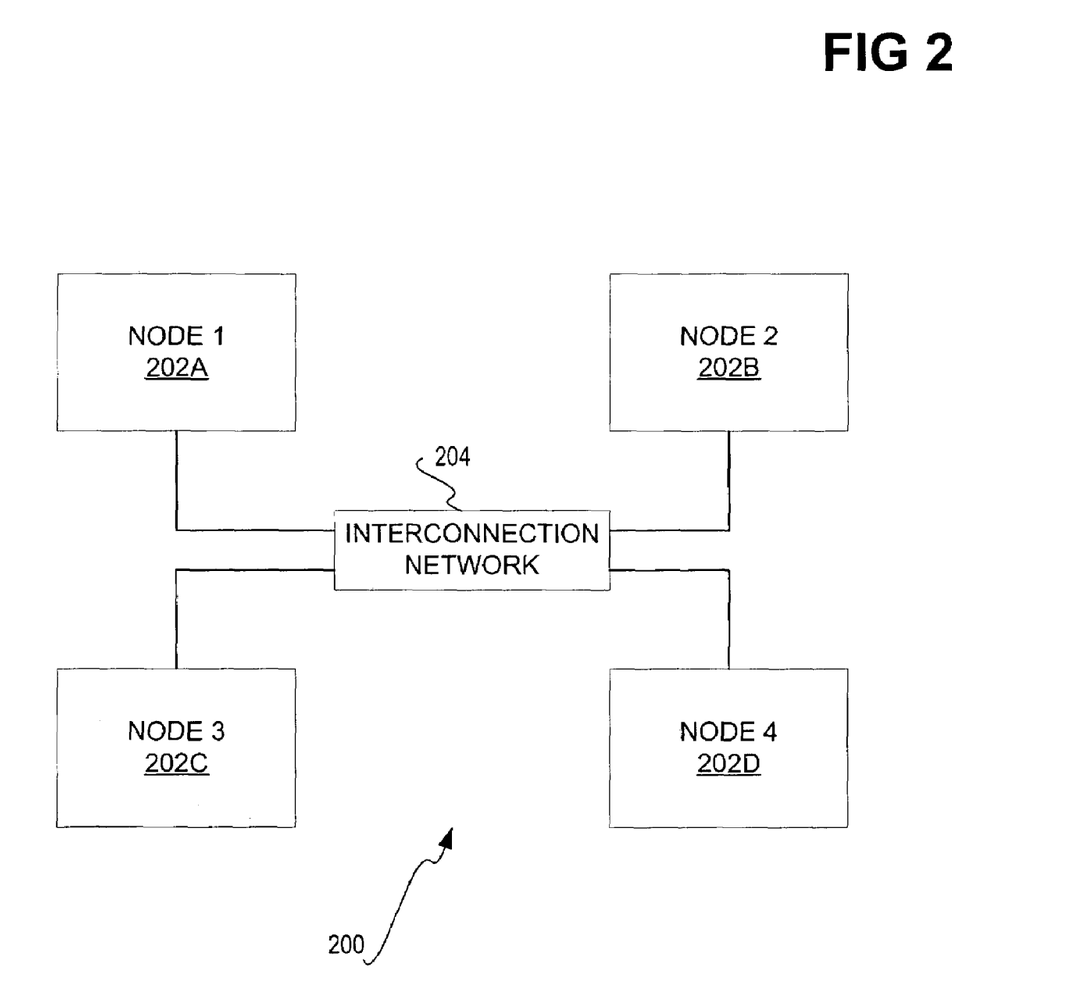
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
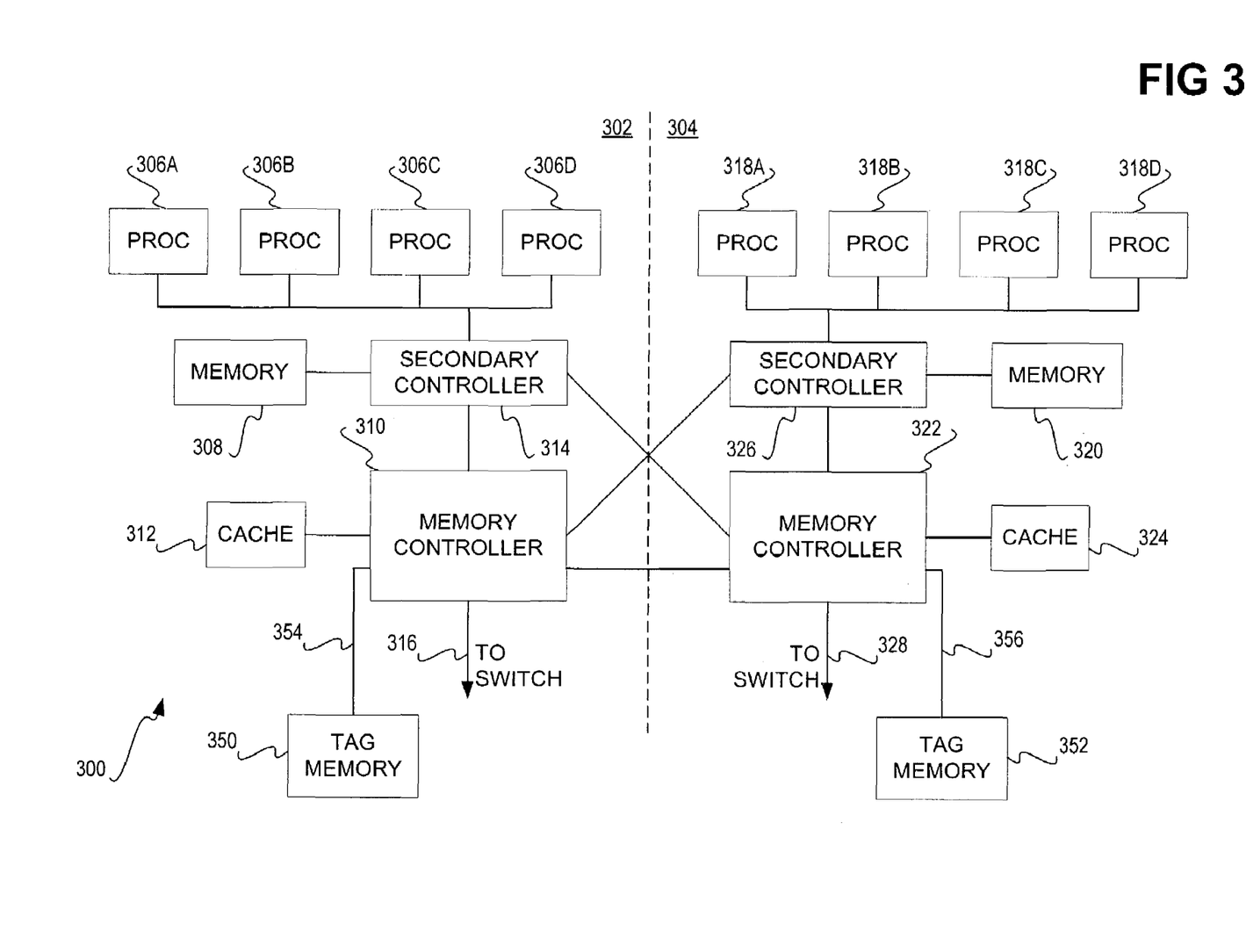
FIG. 3 is a diagram of one of the nodes of the system of FIG. 2 in more detail, according to an embodiment of the invention.

FIG. 3 shows in more detail a node 300, according to an embodiment of the invention, that can implement one or more of the nodes 202 of FIG. 2. As can be appreciated by those of ordinary skill within the art, only those components needed to implement one embodiment of the invention are shown in FIG. 3, and the node 300 may include other components as well. The node 300 is divided into a left part 302 and a right part 304. The left part 302 has four processors 306A, 306B, 306C, and 306D, collectively referred to as the processors 306, whereas the right part 304 has four processors 318A, 318B, 318C, and 318D, collectively referred to as the processors 318. Each of the parts 302 and 304 can operate as a distinct node, or quad, since each has four processors, or the parts 302 and 304 can operate together as a single node.

The left part 302 has a left memory bank 308, whereas the right part 304 has a right memory bank 320. The memory banks 308 and 320 represent a contiguous amount of random-access memory (RAM) local to the node 300 that is divided into the two banks 308 and 320. They may be divided in a number of different ways. For instance, the left bank 308 may have odd memory lines associated with it, whereas the right memory bank 320 may have the even memory lines associated with it. As another example, the left bank 308 may have the first half of the memory lines, whereas the right memory bank 320 may have the second half of the memory lines.

The left memory controller 310 manages requests to and responses from the left memory bank 308, whereas the right memory controller 322 manages requests to and responses from the right memory bank 320. Each of the controllers 310 and 322 may be an applications-specific integrated circuit (ASIC) in one embodiment, as well as another combination of software and hardware. The controllers 310 and 322 also have caches 312 and 324, respectively, for managing requests and responses that relate to remote memory, which is the local memory of the nodes other than the node 300. Stated another way, the memory banks 308 and 320 are local to the node 300, and are remote to nodes other than the node 300.

Further, a left secondary controller 314 specifically interfaces the memory 308, the processors 306, and the memory controller 310 with one another, and a right secondary controller 326 specifically interfaces the memory 320, the processors 318, and the memory controller 322 with one another. The left memory controller 310 is able to communicate directly with the right memory controller 322, as well as the secondary controller 326. Similarly, the right memory controller 322 is able to communicate directly with the left memory controller 310 as well as the secondary controller 314. Each of the memory controllers 310 and 322 is preferably directly connected to the interconnection network that connects all the nodes, such as the interconnection network 204 of FIG. 2. This is indicated by the line 316, with respect to the memory controller 310, and by the line 328, with respect to the memory controller 322.

Tag memories 350 and 352 exist for the caches 312 and 324, respectively, through which the controllers 310 and 312 interface via the tag buses 354 and 356, respectively. The controller 310 thus accesses the tag memory 350 via the tag bus 354 to determine information relating to the cache 312, whereas the controller 322 accesses the tag memory 352 via the tag bus 356 to determine information relating to the cache 324. The tag memories 350 and 352 store information relating to the caches 312 and 324. The tag memories 350 and 352, as well as the caches 312 and 324, may be external or internal to the controllers 310 and 322. The tag memories 350 and 352 store information relating to the remote memory addresses stored by the caches 312 and 324. The controllers 310 and 312 utilize this information to determine whether a given remote memory address is currently being cached by the caches 312 and 324, and the state of the contents of the cache.

The caches 312 and 324 are n-way associative caches, meaning that there are n different locations in the caches 312 and 324 for storing a given remote memory address at each cache index. Preferably, and more specifically, the caches 312 and 324 are two-way caches. Thus, for a given remote memory address, there are two possible cache locations at each cache index within the caches 312 and 324 that can cache the remote memory address. There is also a one-to-one correspondence between all the locations within the caches 312 and 324 and the entries of the tag memories 350 and 352. That is, each cache location has a corresponding tag entry within the tag memories 350 and 352, where a tag entry specifically stores information regarding the cache location to which it corresponds.

Figure 4A:
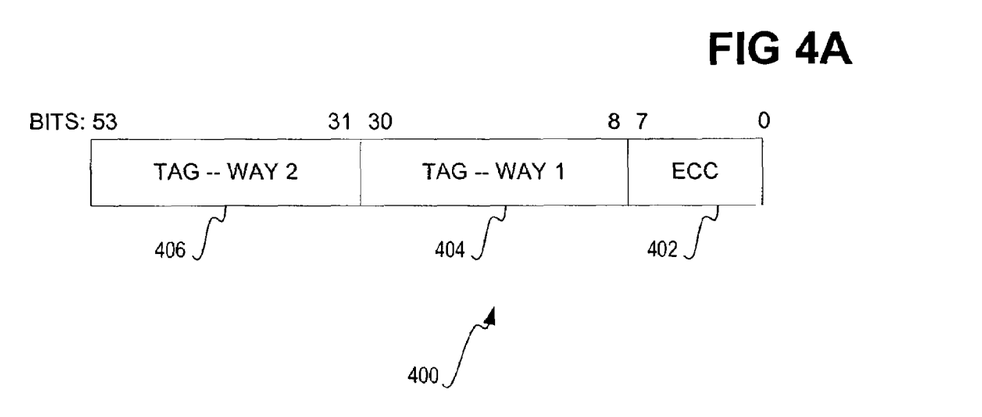
FIGS. 4A and 4B are diagrams of representative tag entries of the tag memory of the node of FIG. 3, where the cache of the node of FIG. 3 is a two-way cache, according to an embodiment of the invention.

FIG. 4A shows a representative pair of tag entries 400, according to an embodiment of the invention. The tag entries 400 are representative of the tag entries within the tag memory 350 and 352 of FIG. 3, and are specifically for an embodiment of the invention where the caches 312 and 324 are two-way caches. The pair of tag entries 400 includes 54 bits, divided among a first-way tag entry 404, a second-way tag entry 406, and an error-correcting code (ECC) 402 for the tag entries 404 and 406. The tag entries 404 and 406 are each 23 bits in length, with the first-way tag entry 404 utilizing bits 8 through 30, and the second-way tag entry 406 utilizing bits 31 through 53. The ECC 402 is 8 bits in length, utilizing bits 0 through 7.

The tag entries 404 and 406 correspond to the two possible cache locations within the caches 312 and 324 of FIG. 3 that can cache a given remote memory address. Thus, the tag entry 404 is referred to as the first-way tag entry 404 because it corresponds to the first cache location that can cache the remote memory address, whereas the tag entry 406 is referred to as the second-way tag entry 406 because it corresponds to the second cache location that can cache the remote memory address. The ECC 402 is the ECC for both the tag entries 404 and 406, and is determined, or calculated, based on the contents of each of the tag entries 404 and 406. Therefore, should one of the tag entries 404 and 406 be modified, the other of the tag entries 404 and 406 is nevertheless needed to determine the ECC 402. The ECC 402 is thus stored as part of the pair of tag entries 400.

For example, when a memory controller retrieves the tag entries 404 and 406, it may then modify one of the tag entries 404 and 406 after modifying the location in the cache for the memory address. The memory controller then updates, or redetermines the ECC 402 for the tag entries 404 and 406. The ECC 402 is based on both the tag entries 404 and 406, including the unmodified tag entry, and the modified tag entry. The memory controller does not have to cause further activity on the tag bus to read the unmodified tag entry, since it preferably retrieves both tag entries 404 and 406 simultaneously, as a group.

Figure 4B:
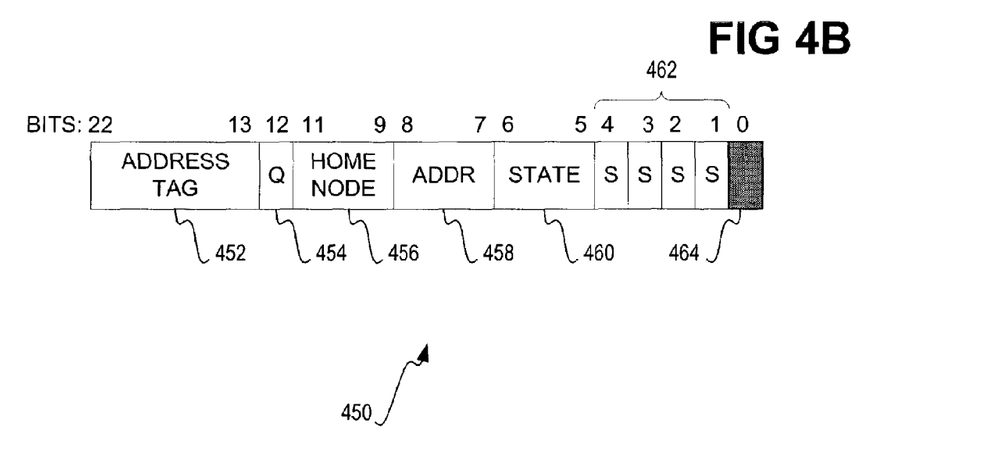

FIG. 4B shows a representative tag entry 450 in detail, according to an embodiment of the invention. The tag entry 450 is representative of the tag entries 404 and 406 of the pair of tag entries 400 of FIG. 4. Thus, the tag entry 450 has 23 bits. Bits 13 through 22 are for an address tag 452. The address tag 452 encompasses a number of bits of a remote memory address, such as bits 26 through 35 thereof, that act as the tag portion of the address, indicating which cache locations the remote memory address can utilize when being cached. Bit 12 is for determining which of the two quads of the node including the tag memory of which the tag entry 450 is a part is the home quad for the location specified by the address tag 452. This is particularly for the embodiment where the node contains a sufficient number of processors, such as eight processors, that the node itself can be divided into two logical sub-nodes, or quads, each having four processors.

Three bits, bits 9 through 11 are for identifying which node in the system is the home node. Thus, there are 2^3=8 possible nodes that may be home for the given address. Bits 7 through 8 are for the address tag 458, which is utilized when the address tag 452 does not contain a sufficient number of bits to properly specify the cache locations that the remote memory address can use. For instance, the address tag 458 may refer to bits 36 and 37 of the remote memory address. Bits 5 and 6 are for the cache state 460. The cache state may be invalid, shared, modified, or exclusive. An invalid cache state indicates that the tag entry 450 is invalid, and is available for allocation. A shared cache state indicates that the cache stores a read-only copy of the remote memory address, whereas a modified cache state indicates that a lower-level cache has the only valid copy of the address. An exclusive cache state indicates that the cache has a modifiable copy of the remote memory address. Finally bits 1 through 4 are local sharing vectors for scalability ports of the node including the tag memory of which the tag entry 450 is a part, and bit 0 is not used.

More Detailed Method

Figure 5:
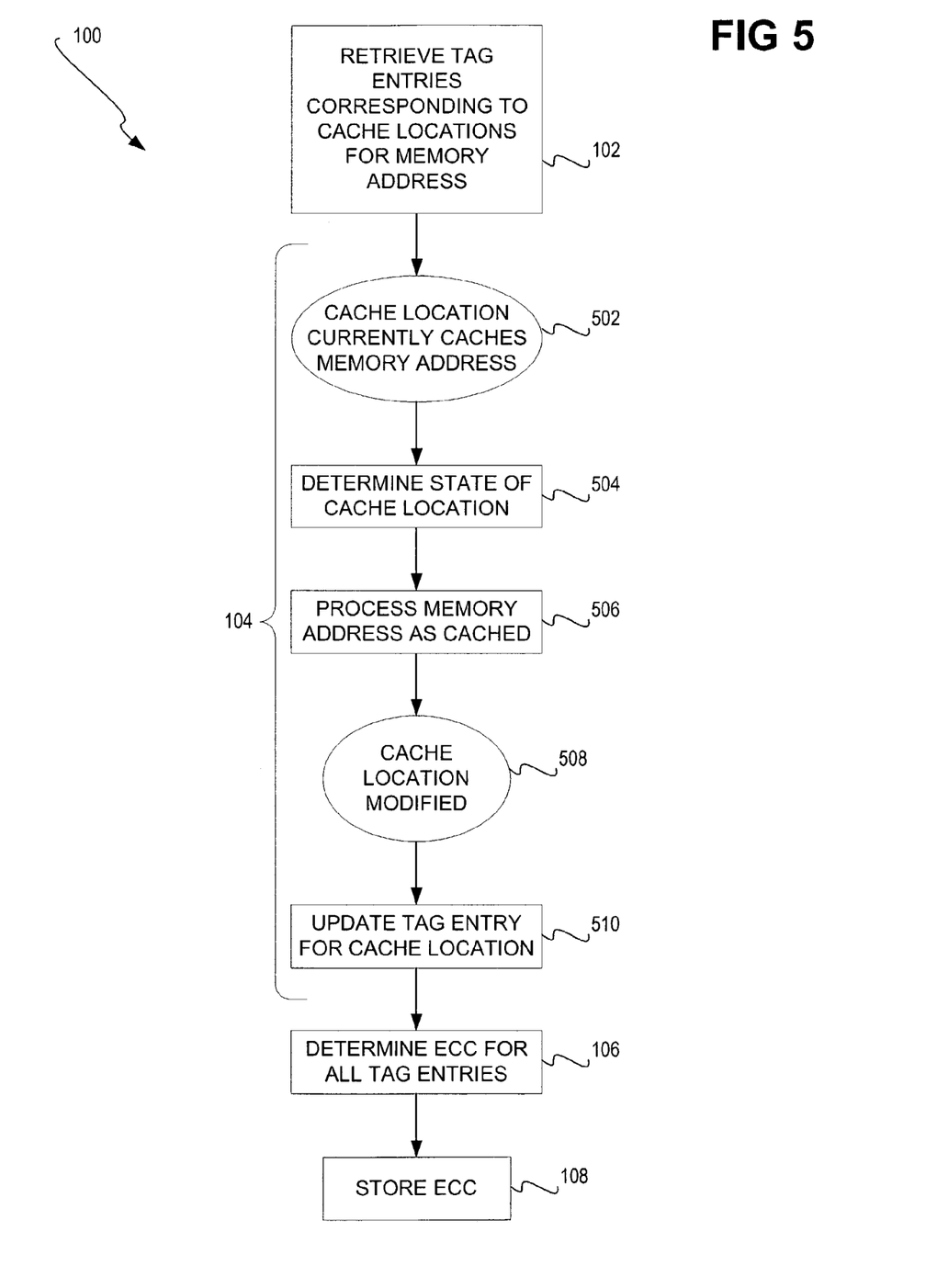
FIG. 5 is a flowchart of a method that is consistent with but more detailed than the method of FIG. 1, according to an embodiment of the invention.

FIG. 5 shows the method 100, according to an embodiment of the invention, which is consistent with but more detailed than the method 100 as is shown in FIG. 1. The n tag entries corresponding to the n cache locations for a given remote memory address are first retrieved, at the same time, and as a group (102), as before. The activity of 104 is particularly divided into a representative example of 502, 504, 506, 508, and 510. After this activity is performed, the error-correcting code (ECC) for all n tag entries is determined (106), and stored as part of the n tag entries (108), also as before.

The activity of 104 as depicted in FIG. 5 specifically contemplates the scenario where one of the n cache locations currently caches the memory address in question (502), as is determined by examining the corresponding tag entry. For instance, the tag portion of the memory address may be found as being equal to the tag portion of the tag entry corresponding to the cache location. The state of this cache location is determined (504), by also examining the tag entry corresponding to the cache entry. The cache location may ultimately be modified (508), such as by being updated or written to, or the contents of the cache location are otherwise processed. The tag entry corresponding to the cache location is updated (510), or modified, such as with new state information regarding the cache location, and so on.

Advantages over the Prior Art

Embodiments of the invention allow for advantages over the prior art. As has been indicated, by having an error-correcting code (ECC) that encompasses the tag entries for all the different cache locations that may cache a given memory address, tag memory is conserved. As has also been indicated, reading the tag entries as a group, at the same time, for all these different cache locations minimizes tag bus activity, and thus promotes optimal performance. All these tag entries need to be read, even if only one of them is subsequently modified, in order to properly update the ECC for the tag entries.

Other Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well.

As another example, the system that has been described has two memory controllers. However, more or fewer memory controllers may also be used to implement a system in accordance with the invention. Furthermore, whereas the invention has been largely described in conjunction with a two-way cache, and a particular demarcation of information stored in tag entries of tag memory, the invention is more generally applicable to an n-way associative cache, and other ways in which information is stored in the tag entries of the tag memory. Accordingly, the scope of protection of this invention is limited only by the following claims and their equivalents.

I claim:

1. A method comprising:
retrieving tag entries of a tag memory corresponding to possible cache locations within an n-way associative cache for a memory address;
in response to determining that a cache location of the possible cache locations within the n-way associative cache is currently caching the memory address, based on the tag entries corresponding to the possible cache locations, determining a state of the cache location based on a tag entry of the tag entries corresponding to the cache location;
processing the contents of the cache location currently caching the memory address;
where the contents of the cache location have been modified, modifying the tag entry corresponding to the cache location;
determining an error-correcting code (ECC) for the tag entries based on the tag entries of the tag memory; and, storing the ECC for the tag entries as part of the tag entries within the tag memory.

2. The method of claim 1, wherein determining that the cache location of the possible cache locations within the n-way associative cache is currently caching the memory address comprises determining that a tag portion of the memory address is equal to a tag portion of the tag entry of the tag entries corresponding to the cache location.

3. The method of claim 1, the method of claim 1, wherein modifying the tag entry corresponding to the cache location comprises updating at least a state portion of the tag entry corresponding to the cache location.

4. The method of claim 1, wherein retrieving the tag entries of the tag memory corresponding to possible cache locations within the n-way associative cache for the memory address comprises retrieving the tag entries as a group of tag entries.

5. The method of claim 1, wherein retrieving the tag entries of the tag memory corresponding to possible cache locations within the n-way associative cache for the memory address comprises retrieving the tag entries simultaneously.

6. The method of claim 1, wherein retrieving the tag entries of tag memory corresponding to possible cache locations within the n-way associative cache for the memory address comprises retrieving a pair of tag entries of tag memory corresponding to two possible locations within a two-way cache for the memory address.

7. The method of claim 1,further comprising, prior to determining the ECC for the tag entries, modifying one or more of the tag entries.

8. The method of claim 7, wherein modifying the one or more of the tag entries comprises updating at least a state portion of the one or more of the tag entries.

9. A system comprising:
a plurality of processors;
an n-way associative cache for remote memory that is remote relative to the plurality of processors;
a tag memory to store tag entries corresponding to possible cache locations within the n-way associative cache for a plurality of memory addresses of the remote memory, the tag entries for the plurality of memory addresses having an error-correcting code (ECC) based on the tag entries; and,
at least one memory controller to manage transactions relative to the n-way associative cache, one of the at least one memory controller retrieving at the same time all tag entries for a given memory address prior to determining whether any of the possible cache locations to which the tag entries correspond currently caches the given memory address.

10. The system of claim 9, further comprising a plurality of nodes, a first node including the plurality of processors, the n-way associative cache, the tag memory, and the at least one memory controller, the other nodes also including a plurality of processors, an n-way associative cache, a tag memory, and at least one memory controller, the plurality of nodes forming a non-uniform memory access (NUMA) architecture.

11. The system of claim 9, wherein the one of the at least one memory controller, upon modifying one or more of the tag entries for the given memory address, redetermines the ECC for the tag entries for storage therewith in the tag memory.

12. The system of claim 9, wherein the n-way associative cache comprises a two-way associative cache, such that the tag memory stores two tag entries corresponding to two possible cache locations within the two-way associative cache for the plurality of memory addresses of the remote memory.

13. The system of claim 9, wherein the tag entries of the tag memory comprise:
an address tag section to indicate a memory address of the remote memory currently being stored within the cache location to which the tag entry corresponds; and,
a state section to indicate a state of the memory address of the remote memory currently being stored within the cache location to which the tag entry corresponds.

14. The system of claim 9, wherein the first and the second memory controllers comprise an application-specific integrated circuit (ASIC).

15. A controller for a node of a system comprising:
an n-way associative cache for remote memory that is remote relative to the node; and,
a tag memory to store tag entries corresponding to possible cache locations within the n-way associate cache for a plurality of memory addresses of the remote memory, the tag entries for the plurality of memory addresses having an error-correcting code (ECC) based on the tag entries,
wherein the controller retrieves at the same time all tag entries for a given memory address prior to determining whether any of the possible cache locations to which the tag entries correspond currently caches the given memory address.

16. The controller of claim 15, wherein upon modifying one or more of the tag entries for the given memory address, the controller redetermines the FCC for the tag entries for storage therewith in the tag memory.

17. The controller of claim 15, wherein the n-way associative cache is one of external and internal to the controller.

18. The controller of claim 15, wherein tag memory is one of external and internal to the controller.

19. The controller of claim 15, wherein the controller comprises an application-specific integrated circuit (ASIC).

* * * * *